United States Patent
Jordan

[15] 3,657,841
[45] Apr. 25, 1972

[54] HORTICULTURAL PLANT GROWING FRAMES

[72] Inventor: Francis Jordan, Ribbleton, England

[73] Assignee: Auriol (Guildford) Limited, Farnham, England

[22] Filed: Nov. 4, 1969

[21] Appl. No.: 873,917

[30] Foreign Application Priority Data

Nov. 23, 1968 Great Britain.......................55,704/68

[52] U.S. Cl..............................................................47/44
[51] Int. Cl............................................................A01g 17/06
[58] Field of Search.................................................47/44–47

[56] References Cited

UNITED STATES PATENTS

| 1,601,481 | 9/1926 | Schreiber | 47/47 |
| 1,653,263 | 12/1927 | Farrington | 47/47 |
| 1,835,092 | 12/1931 | Rowe | 47/47 |
| 2,732,660 | 1/1956 | Morris | 47/47 |

FOREIGN PATENTS OR APPLICATIONS

| 188,957 | 4/1956 | Austria | 47/47 |

Primary Examiner—Robert E. Bagwill
Attorney—Norris & Bateman

[57] ABSTRACT

A plant or horticultural growing frame having a channel base member to receive the ends of vertical rods or wires spaced apart above the base by passing through eyelets in horizontal rods or wires to vary the inclination or contour of the upper ends of the frame.

1 Claim, 4 Drawing Figures

PATENTED APR 25 1972
3,657,841
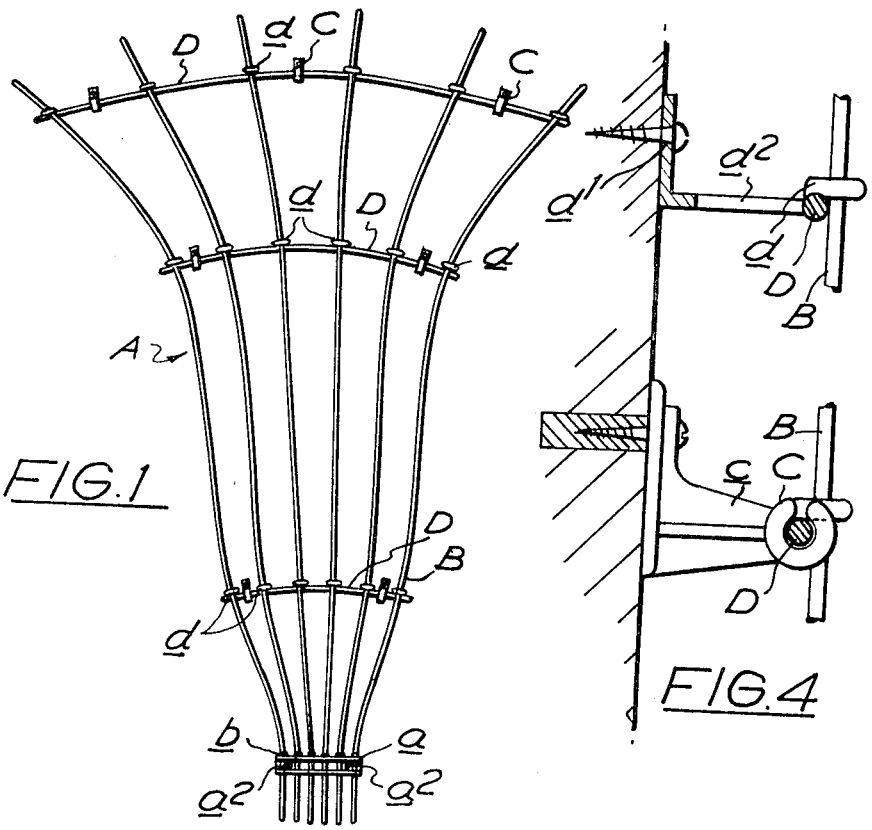
FIG.1
FIG.4
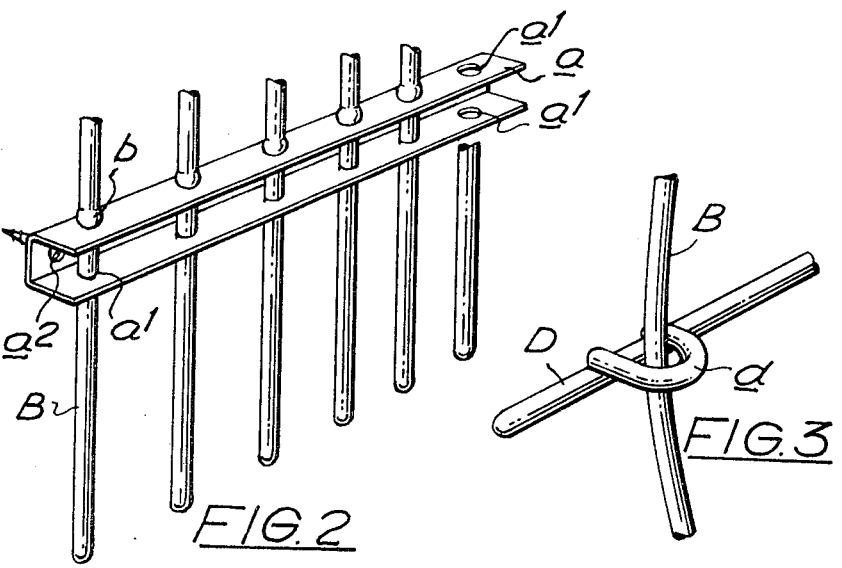
FIG.2
FIG.3
INVENTOR
FRANCIS JORDAN
BY
Norris & Bateman

HORTICULTURAL PLANT GROWING FRAMES

This invention relates to improvements in horticultural plant growing frames.

According to the invention a plant growing frame comprises a member to receive one end of each of a plurality of vertical wires or rods, the ends of the wires or rods above the member being spaced apart by one or more substantially horizontal rods or wires formed with eyelets through which the vertical rods or wires pass, movement of the horizontal wires or rods up or down the vertical rods or wires varying the inclination and contour of the upper ends thereof.

The invention will be described with reference to the accompanying drawings:

FIG. 1 is a front elevation of the frame;

FIG. 2 is a perspective view to a larger scale of the lower end of the frame;

FIG. 3 is a perspective view of part of a supporting horizontal rod with a vertical wire or rod passing therethrough;

FIG. 4 is a vertical section showing a bracket for supporting the frame.

A plant growing frame A is constructed of a channel member $a$ having a plurality (for example six) bores or holes $a^1$ extending through the two flanges of the channel and with holes in the base $a^2$ for attachment to a wall or other support.

A plurality of vertical wires or rods B are inserted through the bores or holes $a^1$ in the flanges of the channel member, an enlarged shoulder $b$ being formed adjacent the lower ends of the wires or rods to limit their downward movement through the channel member. Alternatively the lower ends of the vertical wires or rods B may enter sleeves closed at their lower ends and depending from the bores or holes $a^1$ in the channel member $a$.

The wires or rods B extend upwards from the channel member and are spaced apart by horizontally arranged wires or rods D provided with a plurality of eyelets $d$ spaced along the length of the wire or rod. Each vertical wire or rod B passes through an eyelet $d$ and by spacing the eyelets at greater distances apart than the bores or holes in the channel member the vertical wires or rods are fanned out. By varying the heights of the horizontal wires or rods above the channel member $a$ the inclination and contour of the vertical wires or rods B may be altered. The lengths of the horizontal wires or rods D may be equal or they may as shown be of differing lengths.

Two or more horizontal wires or rods D may be employed in different horizontal planes to constrain the vertical wires or rods B to occupy and required configurations. The horizontal wires or rods D may be provided with further eyelets $d$ formed on arms $d^2$ by which the upper portion of the frame is attached to a wall or other support.

Alternatively the rods D may be affixed to a wall or support by clips or clamps C into which the horizontal wire or rod D controlling the position of the vertical wires or rods B is sprung. The clip or clamp C forms part of a bracket $c$ for attachment to the wall.

The growing frame A may be employed in combination with frames of wires arranged in squares or rectangles to increase the height of the frame.

The wires or rods are preferably of wire but may be of a plastics tube and when of wire may be coated with a p.v.c. or other plastics material.

The frame A is affixed to a wall or other support to act as a climbing frame for plants such as roses, climatis, cordon apple trees, sweet peas or other climbing plants.

What we claim is:

1. A horticultural plant supporting frame comprising a substantially horizontal channel having a plurality of paired openings along its length, a corresponding plurality of generally vertical rods or wires having their lower ends passing through said paired channel openings and enlarged means on said vertical rods or wires immediately above said channel openings preventing downward displacement of said vertical rods or wires with respect to said channel, means comprising a plurality of screws threaded through said channel for fixing said channel to a wall or the like at a desired vertical level, a plurality of substantially horizontal rods or wires disposed in vertically spaced relation above said channel, each of said horizontal rods or wires having a plurality of fixed eyelets through which slidably pass said vertical rods or wires, said eyelets being spaced along the horizontal rods or wires and bonded thereto, at greater distances than said channel openings are spaced, and said horizontal rods or wires being individually shiftable vertically along the vertical rods or wires for selectively varying the lateral inclination and/or contour of the vertical wires or rods, and a plurality of brackets on each of said horizontal rods or wires for fixing them to said wall or the like in the shifted position.

* * * * *